United States Patent [19]

Takagi

[11] Patent Number: 4,800,493

[45] Date of Patent: Jan. 24, 1989

[54] ELECTRONIC CASH REGISTER

[75] Inventor: Hiroshi Takagi, Kyoto, Japan

[73] Assignee: Omron Tateisi Electronics Co., Kyoto, Japan

[21] Appl. No.: 763,641

[22] Filed: Aug. 8, 1985

[30] Foreign Application Priority Data

Aug. 10, 1984 [JP] Japan ................................ 59-169033

[51] Int. Cl.$^4$ ........................ G06F 15/21; G07G 1/00
[52] U.S. Cl. .................................... 364/405; 235/378
[58] Field of Search .............. 364/405, 406, 408, 404; 235/378-381

[56] References Cited

FOREIGN PATENT DOCUMENTS

| 2318678 | 1/1975 | Fed. Rep. of Germany | 364/405 |
|---|---|---|---|
| 0052364 | 3/1984 | Japan | 364/405 |
| 0180059 | 10/1984 | Japan | 364/405 |
| 0020280 | 2/1985 | Japan | 364/404 |

Primary Examiner—Jerry Smith
Assistant Examiner—Kim Thanh Tbui
Attorney, Agent, or Firm—Foley & Lardner, Schwartz, Jeffery, Schwaab, Mack, Blumenthal & Evans

[57] ABSTRACT

An electronic cash register having a price look-up (PLU) function is adapted such that in PLU registering commodities in package of a predetermined package price for a plurality (N) of commodities in package no difference is made of a registered total value between a case where a plurality (N) of commodities are registered collectively as a one package price and a case where the plurality (N) of commodities are individually registered. To that end, the electronic cash register comprises storage means for storing the number of registering of commodities in package in one transaction, determining means for determining that commodities in package are being registered, and arithmatic operation means responsive to the determination for making an arithmetic operation of a registered price in accordance with the equation of price =

$$\left\{ \frac{\left[ \left( \begin{array}{c} \text{number} \\ \text{of} \\ \text{inputs} \end{array} \right) + \left( \begin{array}{c} \text{total number} \\ \text{of registering} \\ \text{so far made} \end{array} \right) \right] \times \text{(package price)}}{\text{commodity number in package}} \right\} -$$

$$\left\{ \frac{\left( \begin{array}{c} \text{total number of} \\ \text{registering so far made} \end{array} \right) \times \text{(package price)}}{\text{commodity number in package}} \right\}$$

2 Claims, 3 Drawing Sheets

ELECTRONIC CASH REGISTER

BACKGROUND OF THE INVENTION

1. Field of the Invention

The present invention relates to an electronic cash register having a so-called price look-up function (hereinafter referred to as "PLU"). More specifically, the present invention relates to an electronic cash register capable of registering commodities of a predetermined package price by using a PLU function in case where a plurality (N) of commodities are collectively sold as a package, where N is an integer being larger than two, and a package price of the plurality (N) of the commodities is predetermined.

2. Description of the Prior Art

In case where a package price is predetermined to represent a total price of a plurality (N) of certain commodities, a conventional electronic cash register caused a difference in a registered total amount between a case where the plurality (N) of the commodities are PLU registered (package PLU registering) and a case where the plurality (N) of commodities are PLU registered individually (split PLU registering). For example, assuming that a package price of ten dollars for three commodities is predetermined, a purchase of three commodities at one time results in a registered price of ten dollars; however, if only one commodity is solely purchased, a price of three dollars and thirty-four cents ($10 \times \frac{1}{3} = 3.34$) is registered and, if three commodities are registered individually, $3.34 + 3.34 + 3.34 = 10.02$ (ten dollars and two cents), with the result that the case of split PLU registering by individual registering causes a registered total price of two cents higher than that in case of package PLU registering.

Therefore, in registering the commodities picked up by a customer in a basket, a difference could be caused in a registered total amount between a case where an operator pays attention to a purchase of a plurality of the same kind of commodities and registers a package price by picking up the same commodities of a predetermined package price and by counting the number of the same and a case where an operator registers individually such commodity without any particular attention, in spite of registering the same kind of commodities. Accordingly, in such a case, a complaint is raised by a customer. In order to avoid such complaint, it is necessary for an operator to pay attention to see how many of the same kind of commodities having a predetermined package price were purchased by a customer, which makes it difficult for an operator to achieve a registering operation efficiently.

SUMMARY OF THE INVENTION

Accordingly, a principal object of the present invention is to provide an electronic cash register wherein no difference is caused in a registered total amount between a case of package PLU registering and a case of split PLU registering for a plurality (N) of commodities having a package price predetermined.

In accordance with the present invention, storage means is provided for storing the number of split PLU registering in one transaction in PLU registering on a split basis the commodities in package, and a registered amount is evaluated by making an arithmetic operation of the equation of $$\text{price} = \left\{ \frac{\left[\binom{\text{number}}{\text{of}}_{\text{inputs}} + \binom{\text{total number}}{\text{of registering}}_{\text{so far made}}\right] \times (\text{package price})}{\text{commodity number in package}} \right\} -$$

$$\left\{ \frac{\binom{\text{total number of}}{\text{registering so far made}} \times (\text{package price})}{\text{commodity number in package}} \right\}$$

based on the number of inputs entered by entry means and the number of registering stored in the storage means.

Accordingly, in registering the commodities in package having a predetermined package price for a plurality (N) of commodities, no difference is caused in a registered total amount between a case of split PLU registering and a case of package PLU registering. As a result, an operation for accounting processing is simplified and a registering operation can be done at an increased speed without causing an operation error.

These objects and other objects, features, aspects and advantages of the present invention will become more apparent from the following detailed description of the present invention when taken in conjunction with the accompanying drawings.

Figure 4:
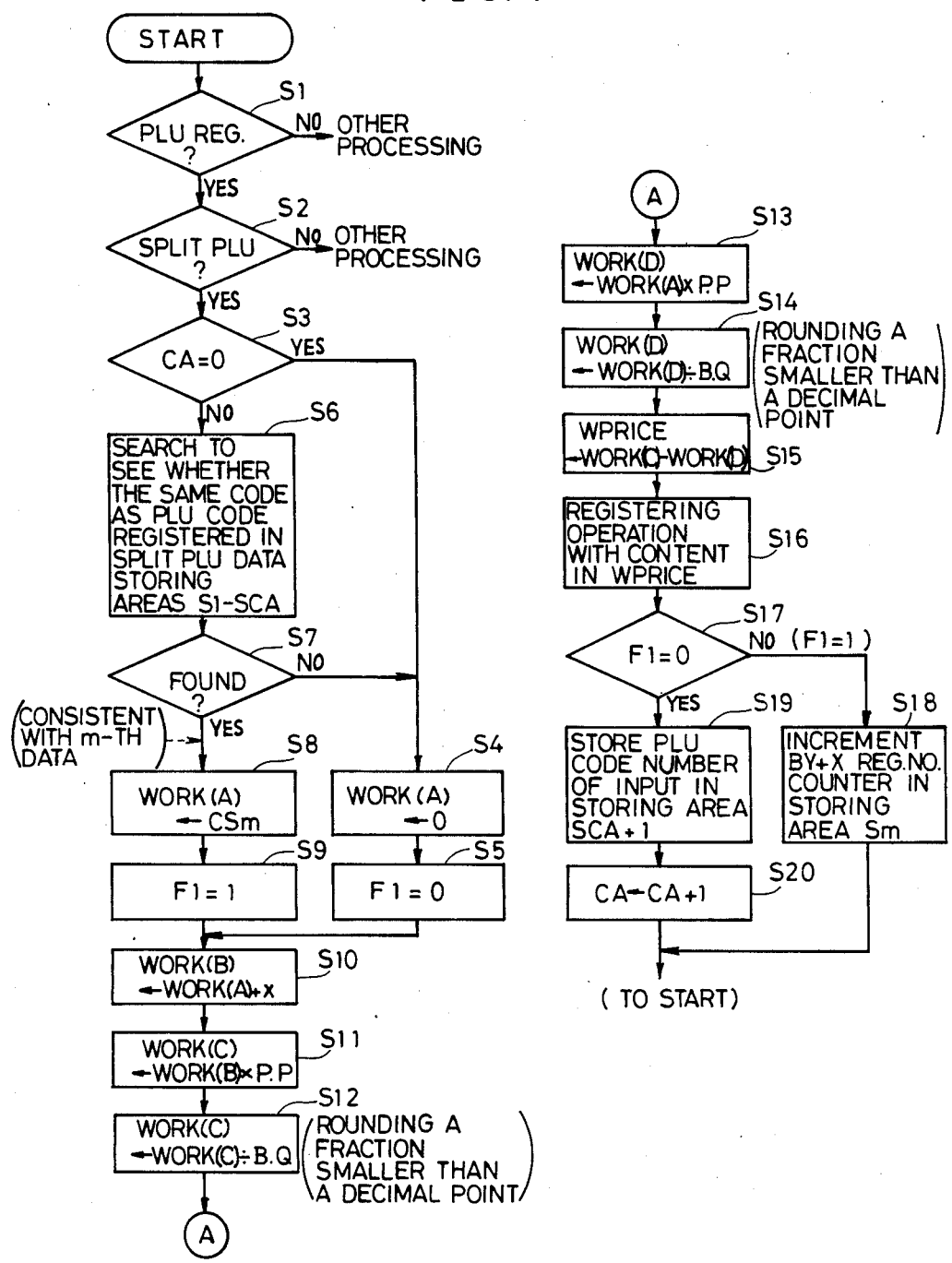
Figure 3:
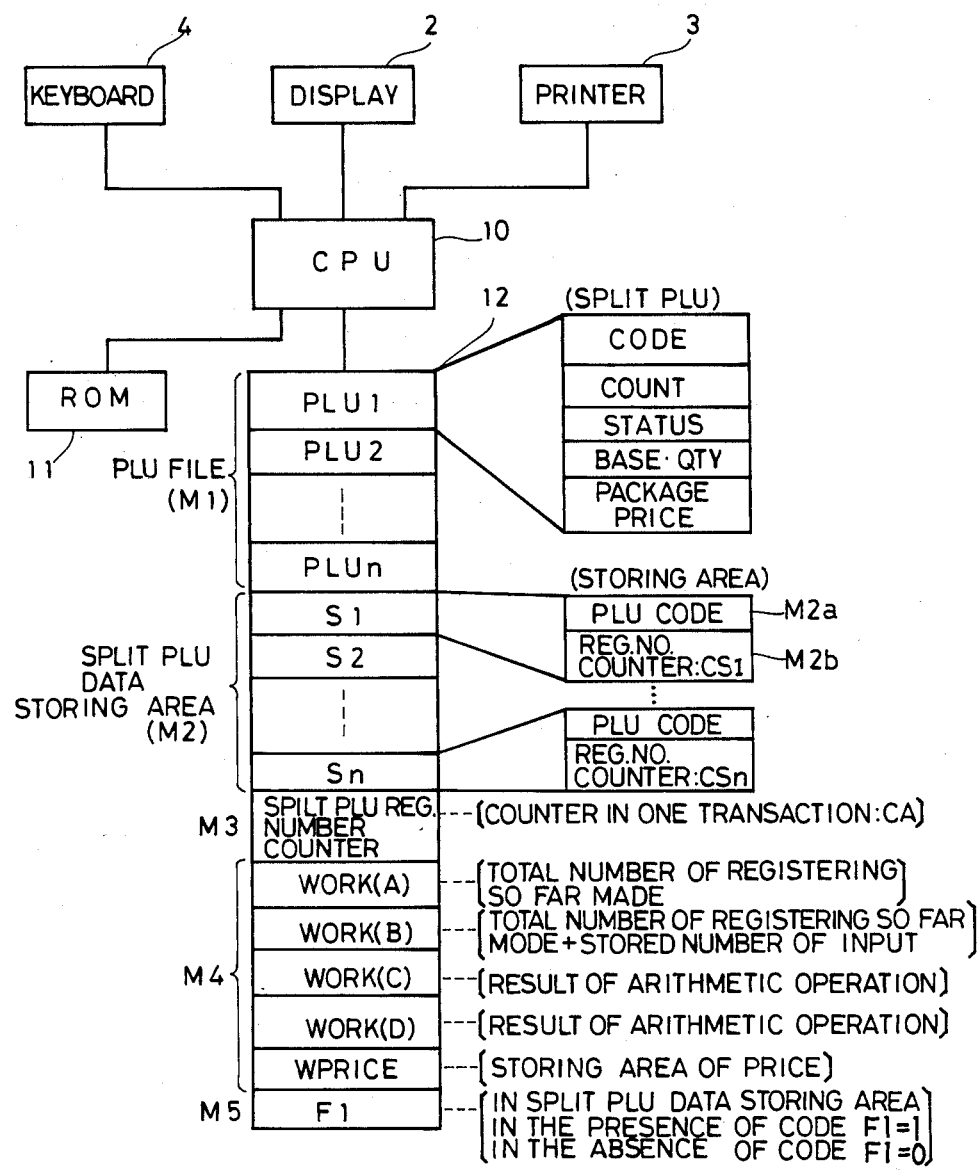

FIG. is plan view showing one example of an arrangement of a keyboard;

FIG. 3 is a block diagram showing a structure of a control portion of an electronic cash register of one embodiment in accordance with the present invention;

FIG. 4 is a flow chart depicting an operation of an electronic cash register of one embodiment in accordance with the present invention.

DESCRIPTION OF THE PREFERRED EMBODIMENTS

Throughout the description of the present invention several terms specific to the present invention are used and for facility of understanding of the description these are first defined as set forth in the following.

Commodities in package: commodities to be sold in package of a plurality (N) of the commodities, where N is an integer being larger than two, having a package price predetermined for the plurality (N) of commodities, irrespective of whether a unit price of each commodity is determined or not.

package price: a predetermined price of commodities to be sold in package of a plurality (N) of commodities.

commodity number in package (BASE-QTY): the number of commodities in package.of a plurality (N) of the commodities.

PLU registering: registering a price of a commodity by reading a price of the corresponding commodity in response to entry of a commodity code, in case where a code is determined for each commodity and a commodity price is stored for each code.

split PLU registering: PLU registering individually each of the commodities in package in stead of registering a plurality (N) of the commodities in package by a package price.

Figure 1:
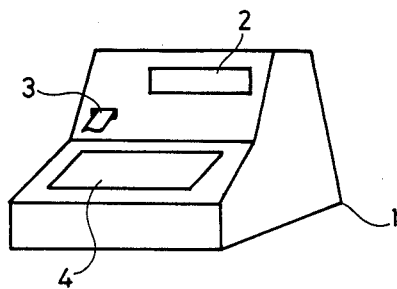
FIG. 1 is perspective view showing an outline of an electronic cash register of one embodiment in accordance with the present invention.

FIG. 1 is a perspective view showing an appearance of an electronic cash register in accordance with one embodiment of the present invention. Referring to FIG. 1, a main body 1 of the inventive electronic cash register comprises a display 2, a printer 3 and a keyboard 4.

Figure 2:
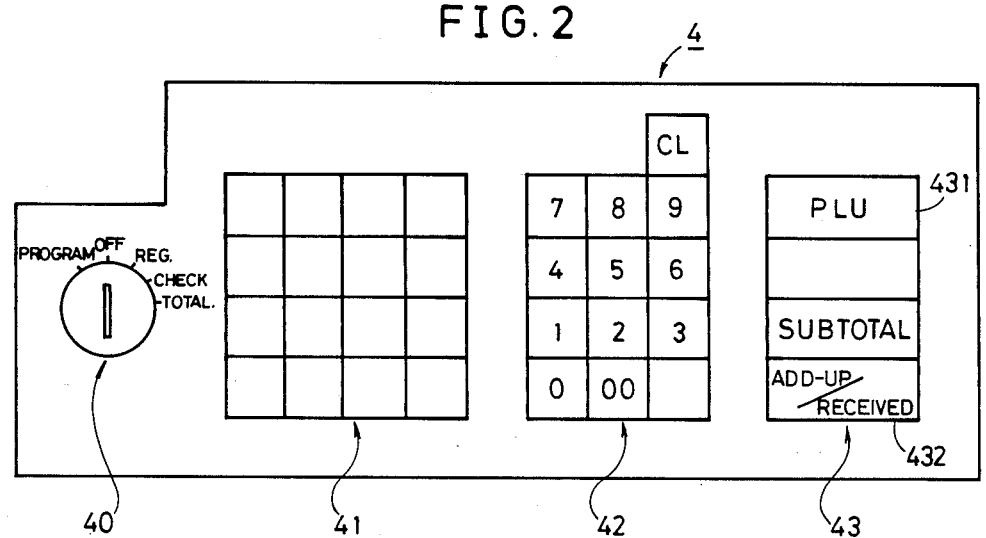

FIG. 2 is a plan view showing an arrangement of the keyboard 4. The keyboard 4 includes a mode selection switch 40, department keys 41, ten-keys 42 and function keys 43. The mode selection switch 40 is provided to select a program mode, a power-off state, a registering mode, a check mode and a totalization mode. The department keys 41 are provided to designate departments of commodities to be registered. The example shown is structured to be capable of designating sixteen departments in total. Ten-keys 42 are provided to enter a PLU code, a sale amount and the like. The function keys 43 are provided for manual operation for entry of various kinds of function commands and comprise a PLU key 431 and an add-up/received key 432. The PLU key 431 is provided for entering a PLU registering command. The add-up/received key 432 is provided for commanding an add-up operation of the data of all the commodities purchased by a customer and for commanding a change operation.

FIG. 3 is a block diagram showing a structure of a control portion of one embodiment of the present invention. Referring to FIG. 3, the electronic cash register of the embodiment comprises a central processing unit 10 functioning as a center of an arithmetic operation control. The central processing unit 10 has the above described display 2, the printer 3 and the keyboard 4 connected thereto. The central processing unit 10 further has a read-only memory 11 and a random access memory 12 allowing for reading and writing of data.

The read-only memory 11 is in advance loaded with an operation program for the central processing unit 10 to achieve an operation as shown in a flow chart in FIG. 4 to be described subsequently.

The random access memory 12 comprises a plurality of areas for storing various kinds of data in operation of the central processing unit 10. More specifically, the random access memory 12 comprises a PLU file M1, a split PLU data storing area M2, an area M3 for use as the split PLU registration number counter, a work area M4 and an area M5 for use by a flag F1.

The PLU file M1 comprises a PLU data storing areas denoted as PLU1 to PLUn (where n is a positive integer). The respective PLU data storing areas PLU1 to PLUn are used for storing a PLU code, a count value representative of the number of registering, a status and a price of a commodity. In case where commodities are commodities in package, the PLU data storing areas are further used for storing the number of commodities in package (BASE.QTY) in addition to the above described various kinds of data and a package price in place of the price of a commodity.

The split PLU data storing area M2 includes a plurality of storing areas S1 to Sn. The respective storing areas S1 to Sn each comprise a PLU code storing area M2a and a registering number counter M2b. The PLU code storing area M2a is used for storing a code (PLU code) of commodities in package to be split PLU registered. The registering number counter M2b is used for counting the number of times the split PLU registering commodities in package in one transaction.

The work area M4 comprises five areas, WORK(A), WORK(B), WORK(C) and WORK(D) and WPRICE.

The area WORK(A) is used for storing a total number of registering so far made with respect to the commodities in package which are to be entered at this time. More specifically, the count value CSm ($1 \leq m \leq n$) is transferred from the registering number counter M2b of the split PLU data storing area M2 to be stored.

The area WORK(B) is used for storing a number obtained by adding the number of inputs at this time to the content in the area WORK(A).

The areas WORK(C) and WORK(D) are used for storing the result of an arithmetic operation to be described subsequently.

The area WPRICE is used for storing an amount being registered obtained by an arithmetic operation.

The flag F1 in the area M5 is set in the "presence" of and is reset in the "absence" of the PLU code of the commodities in package being presently entered, in the split PLU data storing area M2.

Now an operation formula of a registered amount on the occasion of the split PLU registering will be described.

In the embodiment in discussion, the arithmetic operation of the registration amount on the occasion of the split PLU registration will be carried out by the following equation (1).

$$\text{price} = \left\{ \frac{\left[\begin{pmatrix}\text{number} \\ \text{of} \\ \text{inputs}\end{pmatrix} + \begin{pmatrix}\text{total number} \\ \text{of registering} \\ \text{so far made}\end{pmatrix}\right] \times (\text{package price})}{\text{commodity number in package}} \right\} -$$

$$\left\{ \frac{\begin{pmatrix}\text{total number of} \\ \text{registering so far made}\end{pmatrix} \times (\text{package price})}{\text{commodity number in package}} \right\}$$

Referring to the above described equation (1), (number of inputs) may be defined as the umber of inputs of commodities in package being presently entered, (total number of registering so far made) is defined as the number which is stored in the area WORK(A), "package price" is defined as a package price stored in the PLU file area M1 of the commodities in package being registered.

Referring to the above described equation (1), the first term of the right side evaluates the amount being registered with respect to the value obtained by adding the number of registering so far made to the number of inputs, and the second term of the right side evaluates the registered amount with respect to the number of registering so far made. As a result, by carrying out an arithmetic operation of the equation (1), the current registered amount (price) is evaluated.

Meanwhile, referring to the above described equation (1), rounding of a fraction (counting the fractions as a unit, disregarding the fractions, counting the fractions larger than 5 as a unit and disregarding the rest, or the like) of the result of the operation is carried out in each of the first and second terms at the right side of the equation (1).

FIG. 4 is a flow chart depicting an operation of the embodiment. Referring to FIGS. 1 to 4, an operation of the embodiment will be described. On the occasion of commodity registering, the mode selection switch 40 is turned to the registering mode and the data is entered from various keys of the keyboard 4. When the data is entered, the central processing unit 10 determines whether or not the operation in the PLU registering (the step S1) if the operation is in PLU registering, for example, a PLU code of a commodity is entered by the ten-keys 41 and then the PLU key 431 is depressed. The PLU key 431 is depressed by the number of registering. The central processing unit 10 is responsive to depression of the PLU key 431 to determine that the operation is in the PLU registering. In case where the central processing unit 10 determines that the operation is in the PLU registering, the central processing unit 10 further determines whether or not the operation is in the split PLU registering (the step S2). The determination is achieved by the central processing unit 10 by investigating the PLU file M1 of the random access memory 12 and by determining whether the PLU data corresponding to the PLU code as entered is stored in the PLU data storing area including the package price. In case where the operation is not in the split PLU registering, then processing of ordinary PLU registering is performed.

In the case of split PLU registering, the central processing unit 10 proceed to the step S3 to determine whether the count value CA in the split PLU registering number counter area M3 of the random access memory 12 is zero or not. Since the count value CA is zero (CA=0) in the case of the first split PLU registering, the central processing unit 10 clears the area WORK(A) and resets the flag F1 (the steps S4 and S5).

On the contrary, in the case where the split PLU registering has been made previously, the count value CA is not zero and the central processing unit 10 proceeds from the step S3 to step S6. Then the central processing unit 10 investigates whether the same code as the entered PLU code has been stored in any of the split PLU data storing areas S1 to Sn. In the case where central processing unit 10 finds the same code, then the central processing unit 10 executes the steps S8 and S9. On the other hand, if and when the central processing unit 10 does not find the same code, then the central processing unit 10 executes the steps S4 and S5.

More specifically, if and when the central processing unit 10 determines that the PLU code of the commodities in package being registered has been stored in the m-th split PLU data storing area Sm, the count value CSm of the said m-th storing area Sm is transferred to the area WORK(A) (the step S8). Then the central processing unit 10 sets the flag F1 (the step S9).

Conversely, in the case where the central processing unit 10 does not find the PLU code of the packaged commodities in package being registered in the split PLU data storing areas S1 to Sn, the central processing unit 10 clears the area WORK(A) and resets the flag F1, as done previously (the steps S4 and S5).

Then at the steps S10, S11 and S12, the central processing unit 10 executes an arithmetic operation of the first term at the right side of the above described equation (1) and at the steps S13 and S14, the central processing unit 10 executes an arithmetic operation of the second term at the right side of the above described equation (1). Then at the step S15 the central processing unit 10 makes an arithmetic operation of subtracting the second term from the first term at the right side of the equation (1), thereby to evaluate the price.

More specifically, the central processing unit 10 makes addition of the input number "X" (which is the number of times of depression of the PLU key 431, as described previously) and the value stored in the area WORK(A), to store the sum in the area WORK(B) (the step S10), and then makes multiplication of the value in the area WORK(B) by the package price P.P., to store the product in the area WORK(C) (the step S11). Then the central processing unit 10 makes division of the value in the area WORK(C) by the commodity number in package, to store the quotient in the area WORK(C) (the step S12). As a result, it follows that the value of the first term at the right side of the above described equation (1) is stored in the area WORK(C).

Then the central processing unit 10 makes multiplication of the value in the area WORK(A) by the package price, to store the product in the area WORK(D) (the step S13) and then makes division of the value in the area WORK(D) by the commodity number in package, to store the quotient in the area WORK(D) (the step S14). As a result, it follows that the value of the second term at the right side of the above described equation (1) is stored in the area WORK(D). Meanwhile, the central processing unit 10 makes a rounding operation with respect to the fractions smaller than a decimal point at the steps S12 and S14.

The central processing unit 10 makes subtraction of the content in the area WORK(D) from the content in the area WORK(C) to store the difference int the area WPRICE (the step S15). As a result, the amount (the price) registered at this time of the commodities in package is stored in the area WPRICE.

Then the central processing unit 10 makes a registering operation of the registered amount thus obtained at the step S15 (the step S16).

Then the central processing unit 10 determines a set state of the flag F1 (the step S17). If and when the flag F1 is in a set state, the central processing unit 10 makes an operation of +X in the registering number counter of the m-th split PLU data storing area Sm. Conversely, if and when a reset state of the flag F1 is determined, the central processing unit 10 stores the PLU code and the count value of the number of inputs in the new split PLU data storing area S(CA+1) of the count value (CA+1) of the area M1. More specifically, the central processing unit 10 stores the PLU code in the area M2a of the split PLU data storing area A(CA+1) and the count value of the number of inputs in the area M2b of the split PLU data storing area S(CA+1). Then the central processing unit 10 makes an increment of +1 in the registering number counter of the area M3 since the kind of the commodities in package is increased by one (the step S20).

Since the commodities in package are registered by the above described series of operations, no difference is caused in the total amount between a case where a plurality (N) of commodities in package having a package price predetermined for a plurality (N) of the commodities are collectively registered and a case where a plurality (N) of commodities are separately registered. Accordingly, an operator need not take notice of the total number of the commodities in package on the occasion of registering and can register the commodities collectively or individually, as desired.

Meanwhile, in the above described equation (1) was made to evaluate the registered amount. However, in order to evaluate a registered amount, a memory table or the like storing the registered amount may be used. For example, in case of the commodities in package having a predetermined unit price of 40 cents per each commodity and a predetermined package price of one dollar for three commodities, registering can be done without causing any difference in the amount between a case where the commodities are registered collectively or a case where the commodities are registered separately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of operating an electronic cash register to register commodity prices using split PLU registering, said method comprising the steps of:
   a. storing a plurality of packaged commodity data words, corresponding to a plurality of packaged commodities, in a memory having a plurality of PLU data storing memory areas, each of said packaged commodity data words including a commodity code, a total package price, and a commodity number indicating the number of individual commodities in each of said packaged commodities;
   b. entering into said electronic cash register a commodity code for an individual commodity and a registering number indicating the quantity of said individual commodity to be registered;
   c. determining if split PLU registering is applicable to said entered commodity code by locating matching package commodity data word in said plurality of package commodity data words, said matching package commodity data word comprising one of said plurality of data words in which the included commodity code is equivalent to said entered commodity code for an individual commodity;
   d. determining if a count value (CA), indicative of whether split PLU registering has been performed previously, is zero if split FLU registering is applicable to said entered commodity code;
   e. setting a total number registered value stored in a first memory area to zero and resetting a flag if said count value (CA) is equal to zero, and if said count value (CA) is not equal to zero, determining if said entered commodity code has previously been entered;
   f. setting said total number registered value in said first memory are equal to a registering number counter value (CSm) indicative of the quantity of said individual commodity corresponding to said entered commodity code that has previously been entered and setting said flag if said entered commodity code has previously been entered, and setting said total number registered value in said first memory area equal to zero and resetting said flag if said entered commodity code has not been previously entered;
   g. calculating with a processor unit a sum of said registering number and said total number registered value stored in said first memory area, and storing said sum in a second memory area;
   h. calculating with said processor unit a first rounded result of the division of a product of said package price and said sum stored in said second memory area by the commodity number included in said matched packaged commodity data word and storing said first rounded result in a third memory area;
   i. calculating with said processor unit a second rounded result of the division of a product of said sum stored in said first memory area and the package price included in said matched packaged commodity data word by said commodity number included in said matched packaged commodity data word, and storing said second rounded result in a fourth memory area; and
   j. calculating with said processor unit a final result value based on the numerical difference between said first rounded result stored in said third memory area and said second rounded result stored in said fourth memory area and indicating on an indicator unit that an amount to be registered for said entered commodity code is said final result value.

2. A method of operating an electronic cash register as set forth in claim 1, further comprising the steps of:
   k. incrementing by said registering number said registering number counter value (CSm) if said flag is set; and
   l. storing said entered commodity code in one of said plurality of PLU data storing memory area and incrementating said count value (CA) stored in said split PLU registering number counter by one if said flag is not set.

* * * * *